United States Patent [19]
Frary

[11] Patent Number: 6,100,788
[45] Date of Patent: Aug. 8, 2000

[54] MULTIFUNCTIONAL ELECTROMAGNETIC TRANSPONDER DEVICE AND METHOD FOR PERFORMING SAME

[75] Inventor: James Martin Frary, Louisville, Colo.

[73] Assignee: Storage Technology Corporation, Louisville, Colo.

[21] Appl. No.: 08/998,850

[22] Filed: Dec. 29, 1997

[51] Int. Cl.[7] .................................................. H04Q 5/22
[52] U.S. Cl. ............................................................. 340/10.1
[58] Field of Search ........................... 340/825.54, 572.1, 340/573, 568.1, 825.35, 572.7, 572.2, 825.31; 342/44, 51, 42; 455/274, 277.1; 343/700; 332/119; 348/13; 156/213; 364/188

[56] References Cited

U.S. PATENT DOCUMENTS

| | | |
|---|---|---|
| 4,794,470 | 12/1988 | Lauffenburger et al. ............. 340/572.1 |
| 5,321,395 | 6/1994 | Van Santbrink ................... 340/825.31 |
| 5,414,412 | 5/1995 | Lian . | 
| 5,565,858 | 10/1996 | Guthrie ............................... 340/825.54 |

*Primary Examiner*—Michael Tokar
*Assistant Examiner*—Jean B. Jeanglaude
*Attorney, Agent, or Firm*—Brooks & Kushman P.C.

[57] ABSTRACT

A multifunctional electromagnetic transponder device for tracking objects, such as tape cartridges, utilized in different types of environments includes a first antenna operating at a first range of frequencies and a second antenna operating at a second range of frequencies, different from the first range of frequencies. A reader/writer mechanism associated with each of the environments generates a first communication signal at the first range of frequencies and a second communication signal at the second range of frequencies. A control logic having a memory is coupled to the first and second antennas for processing the first and second communication signals and automatically generating a first or second response signal for receipt by the reader/writer mechanism via the first and second antennas, respectively.

20 Claims, 3 Drawing Sheets

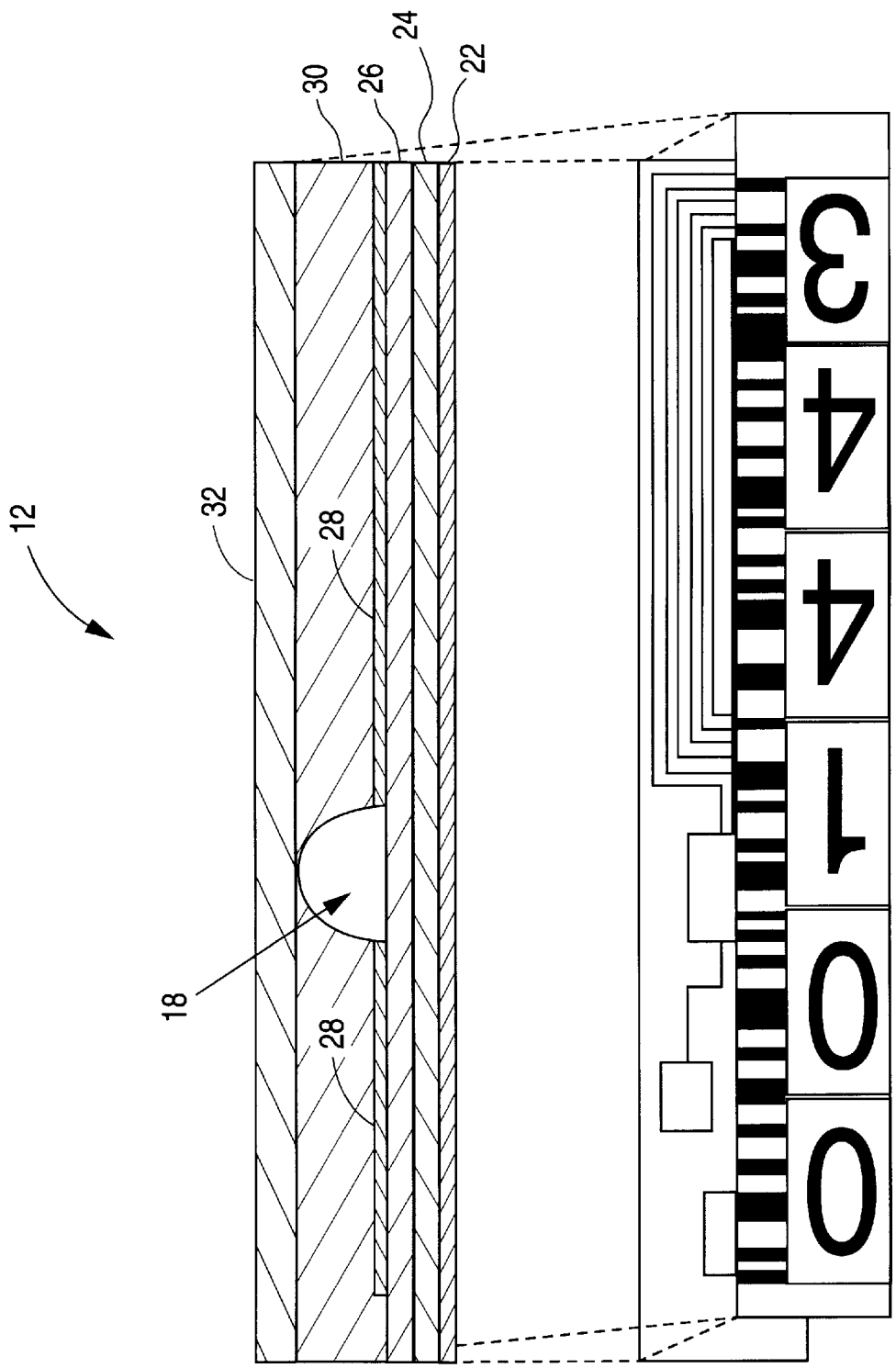

MULTIFUNCTIONAL ELECTROMAGNETIC TRANSPONDER DEVICE AND METHOD FOR PERFORMING SAME

TECHNICAL FIELD

This invention relates to electromagnetic transponder devices for use with objects that must be tracked and identified while existing in different physical environments.

BACKGROUND ART

Some objects, such as, for example, data cartridges, operate in several different physical environments, and it is desirable to track these objects in these environments and while they transfer between the different environments. For example, data cartridges containing large amounts of data are typically stored in data libraries, such as an Automated Tape Library (ATL) shown in FIG. 1. In many cases, the data cartridges are moved in and out of the libraries and even to different geographic locations throughout their lifetime. The problem is that the only information that goes with the cartridge in a readily accessible form is the VOLSER (Volume Serial Number) printed on the cartridge label, as shown in FIG. 2. Tracking cartridges by VOLSER alone requires an extensive VOLSER management system containing large amounts of information concerning associations and relationships with and between the VOLSER and other types of information that describe the cartridge and its contents. This system can be prone to errors and presents many difficulties in accessing, extracting, and sharing information.

Furthermore, it is desirable to closely guard or monitor the removal of the data cartridges from the libraries or data centers. In this case, it is desirable to know which cartridge was removed if an attempted security breach is successful.

There are some situations in which the data cartridges reside outside the ATL environment in manual slot racks. Tracking the location of all tapes as they are moved back and forth between the automated and manual environments is complicated by the need to maintain a 1:1 association between the number of cartridges and the number of manual slots. Since many thousands of tapes can be in libraries at any given time, there are many empty slots taking up valuable floor space. Another problem with slot management is the requirement to always put a given cartridge in the same manual slot, no matter where it may be located or how many empty slots may be closer.

In addition, the objects may sometimes be used in different types of environments. For example, the object may be used in an automated environment in which the objects are typically in a close proximity, highly aligned environment. Alternatively, the objects may also be used in a manual environment in which the objects are typically in a distant, unaligned environment.

Thus, there exists a need for automatically storing and retrieving data associated with the objects so as to track the objects as they move in and out of the different types of environments.

DISCLOSURE OF THE INVENTION

It is a general object of the present invention to provide a multifunctional electromagnetic transponder device for automatically tracking objects utilized in different types of environments.

It is another object of the present invention to provide a multifunctional device for automatically tracking data and location of data cartridges utilized in different types of data processing environments.

In carrying out the above object and other objects, features, and advantages of the present invention, a method is provided for tracking an object utilized in an automated environment as well as a manual environment. The method includes the step of generating and transmitting a first and second communication signal at a first and second range of frequencies, respectively. The method also includes the steps of receiving the first communication signal when the object is in the automated environment, and receiving the second communication signal when the object is in the manual environment. The method further includes the step of processing the first and second communication signals so as to store information associated with the object.

In further carrying out the above object and other objects, features, and advantages of the present invention, a device is also provided for carrying out the steps of the above described method. The device includes a first antenna for receiving the first communication signal when the object is in the automated environment, and a second antenna for receiving the second communication signal when the object is in the manual environment. Finally, the device includes control logic coupled to the first and second antennas and having a memory for processing the first and second communication signals so as to store data associated with the object.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 5 is a cross-sectional view of the device shown in FIG. 4; and

FIG. 6 is a top view of the device shown in FIG. 5.

BEST MODES FOR CARRYING OUT THE INVENTION

Figures 1, 2:
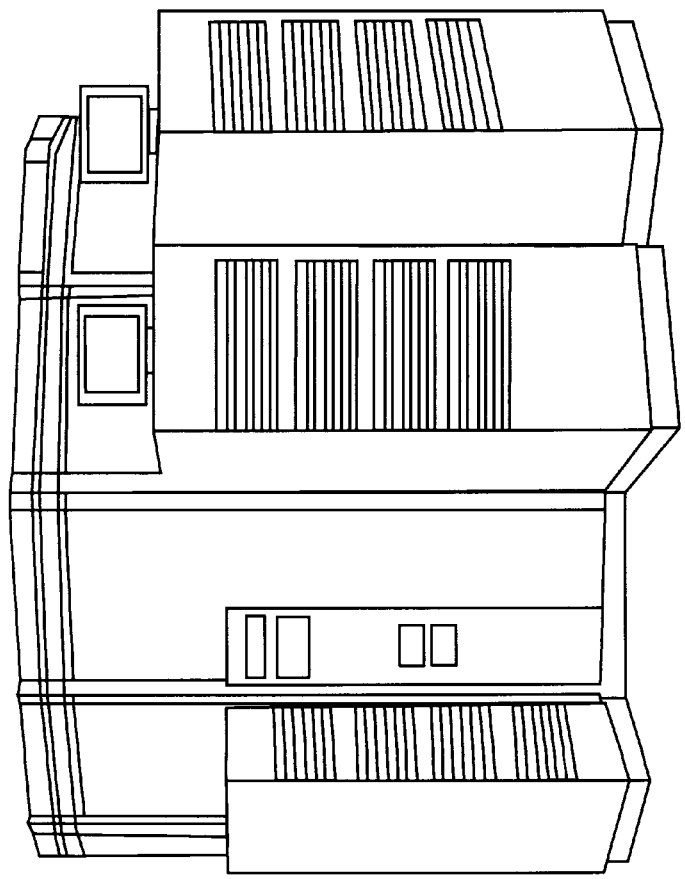
FIG. 1 is a diagram of an Automated Tape Library (ATL) environment.
FIG. 2 is a diagram of a VOLSER label typically utilized in an ATL environment.
Figure 3:
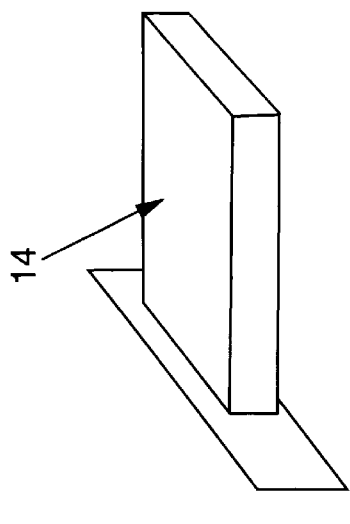
FIG. 3 is a diagram illustrating the environment in which the present invention is utilized.

Turning now to FIG. 3, there is shown a diagram illustrating the environment in which the present invention is utilized. The present invention will be described utilizing a tape cartridge as the object, although other types of objects may be tracked utilizing the device of the present invention. The tape cartridge 10 houses a tape (not shown) containing data. A multifunctional electromagnetic transponder (EMT) device 12 constructed in accordance with the teachings of the present invention is attached directly to the tape cartridge 10.

EMT device 12 stores data associated with the tape cartridge 10 and interacts with a reader/writer mechanism 14. The reader/writer mechanism 14, as is known in the art, includes circuitry for reading and writing data to the EMT device 12 via electromagnetic fields. The reader/writer mechanism 14 utilized in the present invention, however, reads and writes data at least two different ranges of frequencies, as will be described in greater detail below.

Data is read from and written to the EMT device 12 in a predetermined format utilizing a carrier frequency with the appropriate communication protocol and "handshaking" process. The EMT device 12 operates only in response to a signal from the reader/writer mechanism 14. The signal from the reader/writer mechanism 14 supplies energy to the EMT device 12, then sends commands and data embedded in the same signal. When the EMT device 12 is "powered" up by the incoming signal, EMT device 12 responds to the commands and data by sending a return signal bearing the required data.

Figure 4:
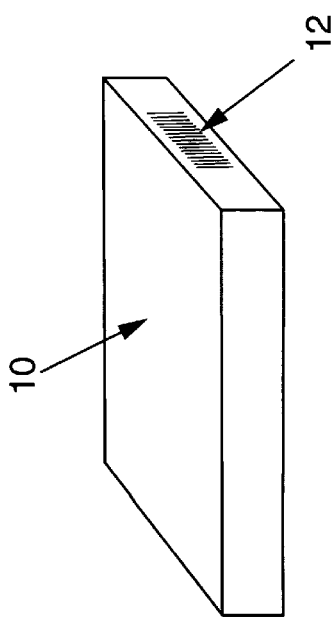
FIG. 4 is a schematic diagram of the device of the present invention.

A schematic diagram of the EMT device 12 is illustrated in FIG. 4. The EMT device 12 is designed to optimize operation of the EMT device 12 for two physically distinct types of operational environments, a close-proximity, highly aligned automated environment and a distant, unaligned manual environment. In order to operate in the close-proximity, highly-aligned environment, the EMT device 12 includes a high frequency antenna 16 that operates at microwave frequencies. The high frequency antenna 16 preferably includes a separate transmit microstrip antenna 16a and receive microstrip antenna 16b. They are preferably separate in order to simplify the design of the analog portion of the integrated circuit 18, discussed below. The carrier signal transmitted from the EMT device 12 to the reader/writer mechanism 14 via the high frequency antenna 16 is a frequency doubled version of the received carrier signal from the reader/writer mechanism 14.

The high frequency antenna 16 is characteristically directional so as to allow isolation of the communication path between the EMT device 12 and the reader/writer mechanism 14 via the relative position of the two. This directionality also provides the capability to measure the relative position between the EMT device 12 and the reader/writer mechanism 14.

The EMT device 12 also includes a low frequency antenna 20 having a radiation pattern much less directional than that of the microstrip antennas 16a, 16b. The lower frequency and reduced directionality of the low frequency antenna 20 allow the EMT device 12 to communicate with the reader/writer mechanism 14 over longer distances (but lower data rates) and with less stringent requirements on relative position or orientation of the EMT device 12 and the reader/writer mechanism 14. These characteristics are best suited for a "manual" environment where there are not necessarily fixed positional relationships between readers 14 and EMTs 12 as in an automated robotic environment. This low frequency structure allows for more variation in positions and locations of tape cartridges while still providing a means of communication with the data stored in the EMT device 12.

The EMT device 12 further includes the Integrated Circuit (IC) 18, including control and storage circuitry, for communicating with the reader/writer mechanism 14 and for storing data, such as metadata. Metadata is data used to describe objects, other data, or characteristics of other data. There may be at least five types of metadata associated with the tape cartridge 10, including data describing the physical volume (i.e., the media vendor, cartridge type, first write, pass counter, defect log, etc.), identifying what is on the physical volume (i.e., VOLSER, access control, security, directories, file origin/attributes, etc.), describing how one uses the information on the physical volume (i.e., last access date/time, expiration, migration, archive status, etc.), describing how the information on the physical volume is related to information on other physical volumes (i.e., data set link information, data group names, etc.), and describing the information content of the data on the physical volume (i.e., source, format, keywords, database index, etc.).

Turning now to FIG. 5, there is shown a cross-sectional view of the preferred EMT device 12 constructed in accordance with the teachings of the present invention. The EMT device 12 includes an adhesive layer 22 for securing the EMT device 12 directly to the object or tape cartridge 10.

A metallic ground plane 24, such as copper, Cu, is disposed on the adhesive layer 22 to provide the substrate for the device 12. The ground plane is covered with a microwave substrate, or dielectric layer, 26 for separating the ground plane 24 from a second metallic layer 28.

The second metallic layer 28, preferably Cu, is disposed on the dielectric layer 26 and etched to form the antenna structures 16 and 20 and electronic interconnects between the antennas 16, 20 and the IC 18. The IC 18 is bonded to the second metallic layer 28 or the microwave substrate 26 and electrically connected to the antennas 16, 20. The IC 18 is preferably encapsulated to provide protection from the environment.

An interposer/spacer layer 30 is added to the device 12 to provide support and a planarized surface on which a paper layer 32 comprising ASCII/barcode images is laminated, as shown in FIG. 6. This entire assembly may be glued to the surface of the tape cartridge 10, as shown in FIG. 3. Alternatively, the antenna/electronic portion of the device 12 could be mounted inside the housing or molded into the housing walls of the tape cartridge 10.

While the best modes for carrying out the invention have been described in detail, those familiar with the art to which this invention relates will recognize various alternative designs and embodiments for practicing the invention as defined by the following claims.

What is claimed is:

1. A multifunctional electromagnetic transponder (EMT) device for use with an object utilized in a close-proximity, highly-aligned automated environment and a distant, less aligned manual environment, each of the environments including a reader/writer mechanism associated therewith for generating one of a first and second communication signal at a first and second range of frequencies, respectively, the device comprising:

a first antenna for receiving the first communication signal when the object is in the automated environment;

a second antenna for receiving the second communication signal when the object is in the manual environment; and a control logic coupled to each of the first and second antennas and having a memory, the control logic for processing the first and second communication signals so as to store information associated with the object.

2. The device as recited in claim 1 further comprising:

the control logic for generating one of a first and second response signal in response to the first and second communication signals, respectively;

the first antenna for transmitting the first response signal at the first range of frequencies for receipt by the reader/writer mechanism; and the second antenna for transmitting the second response signal at the second range of frequencies for receipt by the reader/writer mechanism.

3. The device as recited in claim 2 wherein the reader/writer mechanism generates the first communication signal at a first frequency within the first range of frequencies and the first antenna transmits the first response signal at a second frequency within the first range of frequencies, the second frequency being different from the first frequency.

4. The device as recited in claim 3 wherein the second frequency is double the first frequency.

5. The device as recited in claim 3 wherein the first range of frequencies is higher than the second range of frequencies.

6. The device as recited in claim 5 wherein the first antenna has a directional radiation pattern and the second antenna has a radiation pattern less directional than that of the first antenna.

7. The device as recited in claim 5 wherein the first antenna comprises:

a first microstrip antenna for receiving the first communication signal; and a second microstrip antenna for transmitting the first response signal.

8. The device as recited in claim 1 wherein the first and second antennas are etched on a metallic layer.

9. The device as recited in claim 8 wherein the control logic is bonded onto the metallic layer and electrically connected to the first and second antennas.

10. The device as recited in claim 9 wherein the metallic layer is secured to the object.

11. The device as recited in claim 9 further comprising a label attached to the metallic layer comprising ASCII/barcode data for visually identifying the object.

12. A method for tracking an object utilized in a close-proximity, highly-aligned automated environment and a distant, less aligned manual environment, wherein each of the environments includes a reader/writer mechanism for generating one of a first and second communication signal at a first and second range of frequencies, respectively, the method comprising:

transmitting the first and second communication signals from the reader/writer mechanism;

receiving the first communication signal when the object is in the automated environment;

receiving the second communication signal when the object is in the manual environment; and processing the first and second communication signals so as to store information associated with the object.

13. The method as recited in claim 12 further comprising:

transmitting a first response signal in response to the first communication signal; and transmitting a second response signal in response to the second communication signal.

14. The method as recited in claim 13 wherein the reader/writer mechanism generates the first communication signal at a first frequency within the first range of frequencies and wherein transmitting the first response signal includes transmitting the first response signal at a second frequency within the first range of frequencies, the second frequency being different from the first frequency.

15. The method as recited in claim 14 wherein transmitting the first response signal at the second frequency includes transmitting the first response signal at a second frequency double the first frequency.

16. A multifunctional electromagnetic transponder (EMT) device for use with a tape cartridge having a housing for holding a tape containing data and utilized in a close-proximity, highly-aligned automated environment and a distant, less aligned manual environment, each of the environments including a reader/writer mechanism associated therewith for generating one of a first and second communication signal at a first and second range of frequencies, respectively, the device comprising:

a first antenna for receiving the first communication signal when the tape cartridge is in the automated environment;

a second antenna for receiving the second communication signal when the tape cartridge is in the manual environment; and a control logic coupled to each of the first and second antennas and having a memory, the control logic for processing the first and second communication signals so as to store information associated with the tape cartridge and the tape data in the memory.

17. The device as recited in claim 16 further comprising:

the control logic for generating one of a first and second response signal in response to the first and second communication signals, respectively;

the first antenna for transmitting the first response signal at the first range of frequencies for receipt by the reader/writer mechanism; and the second antenna for transmitting the second response signal at the second range of frequencies for receipt by the reader/writer mechanism.

18. The device as recited in claim 16 wherein the device is secured to the housing of the tape cartridge.

19. The device as recited in claim 16 wherein the device is molded into the housing of the tape cartridge.

20. The device as recited in claim 16 wherein the device is disposed inside the housing of the tape cartridge.

* * * * *